United States Patent [19]

Meacham et al.

[11] Patent Number: 6,122,817
[45] Date of Patent: Sep. 26, 2000

[54] ROTOR ASSEMBLY HAVING LAMINATION STACK THAT IS SEPARATELY PILOTED AND CLAMPED

[75] Inventors: Walter Lee Meacham; Reinhard Manfred Klaass, both of Phoenix, Ariz.; Leon M. Kasdan, West Long Branch; Ratan Moy Guha, Oakhurst, both of N.J.

[73] Assignee: AlliedSignal Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,820

[22] Filed: Sep. 19, 1997

[51] Int. Cl.[7] .............................. H02K 15/02; H02K 1/06
[52] U.S. Cl. .............................. 29/598; 29/596; 310/217; 310/259
[58] Field of Search .............................. 29/598, 596, 732, 29/734, 889.2, 889.21, 888.025; 310/217, 218, 259

[56] References Cited

U.S. PATENT DOCUMENTS

| 3,802,068 | 4/1974 | Scott | 29/598 |
|---|---|---|---|
| 3,840,983 | 10/1974 | Ryff | 29/598 |
| 3,990,141 | 11/1976 | Stark | 29/596 |
| 4,079,512 | 3/1978 | Lakes | 29/732 |
| 4,197,975 | 4/1980 | Williamson | 29/598 |
| 4,499,660 | 2/1985 | Lenz | 29/598 |
| 4,608,752 | 9/1986 | Muller | 29/598 |
| 4,815,673 | 3/1989 | Wheeler | 29/596 |
| 4,970,424 | 11/1990 | Nakamura et al. | 310/262 |
| 5,010,638 | 4/1991 | Lanfranco | 29/596 |
| 5,272,803 | 12/1993 | Harrison et al. | 29/596 |
| 5,477,092 | 12/1995 | Tarrant | 310/43 |
| 5,563,463 | 10/1996 | Stark | 29/598 |
| 5,661,894 | 9/1997 | Kawasaki et al. | 29/596 |
| 5,678,299 | 10/1997 | Mochizuki et al. | 29/888.025 |
| 5,704,111 | 1/1998 | Johnson et al. | 29/598 |
| 5,758,404 | 6/1998 | Baumann et al. | 29/598 |
| 5,758,408 | 6/1998 | Choi | 29/732 |
| 5,771,566 | 6/1998 | Pop, Sr. | 29/598 |
| 5,829,120 | 11/1998 | Uchida et al. | 29/598 |

FOREIGN PATENT DOCUMENTS

| 2072626 | 9/1971 | France . |  |
|---|---|---|---|
| 2 322 632 | 11/1974 | Germany . |  |
| 25 25 548 | 12/1975 | Germany . |  |
| 59-226630 | 12/1984 | Japan | 29/597 |
| 1189548 | 4/1970 | United Kingdom . |  |

Primary Examiner—Lee Young
Assistant Examiner—A. Dexter Tugbdng
Attorney, Agent, or Firm—William J. Zak, Jr., Esq.

[57] ABSTRACT

A rotor assembly includes a lamination stack, a pilot shaft for providing radial piloting for the lamination stack, and clamp for applying an axially compressive force to the lamination stack. Decoupling the piloting from the clamping allows the diameter of the rotor assembly to be increased. Resulting is a rotor assembly having a shorter axial length and higher tip speed.

5 Claims, 3 Drawing Sheets

ROTOR ASSEMBLY HAVING LAMINATION STACK THAT IS SEPARATELY PILOTED AND CLAMPED

The invention was made under contract no. F33615-92-C-2224, awarded by the U.S. Air Force. The Government has certain rights in the invention.

BACKGROUND OF THE INVENTION

The invention relates generally to electrical machines. More particularly, the invention relates to a laminated rotor assembly for an electrical machine.

Laminated rotors assemblies are used in electric generators, electric motors and electric starters for turbomachines such as Auxiliary Power Units (APUs) and Integrated Power Units (IPUs), and propulsion systems such as turbofan systems, turboprop systems and turboshaft systems. Typically, these electrical machines are external to their turbine engines, contain their own bearing systems and, for high-speed turbine engines, are driven by gears.

Integration of the electrical machine with the turbine engine is desirable because gears and bearings can be eliminated and construction simplified. However, such integration requires the laminated rotor assembly to have a high relative stiffness, adequate torque transfer, and an ability to maintain piloting and balance at high operating speeds.

Increasing the diameter of the rotor assembly in the electrical machine is also desirable because tip speed can be increased and axial length can be reduced, all without reducing power output of the electrical machine. Reducing the axial length of the rotor assembly also allows dynamic performance to be improved.

However, increasing the diameter of the rotor assembly is difficult to do. The rotor assembly includes a stack of laminations, which are secured to a shaft by way of an interference fit. As the diameter of the lamination stack is increased, the interference fit becomes larger. The larger interference causes problems during assembly. A larger interference fit needs a larger axial load to clamp the lamination stack. Yet only so much force can be applied to the shaft to force it into the lamination stack's bore. The larger interference fit also causes problems during high temperature/high speed operation of the rotor assembly. If the interference fit between the laminations and the shaft is lost, the rotor assembly suffers large amounts of unbalance and vibration that could cause damage.

Increasing the diameter of the rotor assembly is even more difficult to do for an electrical machine that is integrated with the turbine engine. Loss of the interference fit reduces the ability of the rotor assembly to maintain piloting and balance at high speeds. Moreover, the laminated rotor assembly has low relative stiffness. Yet the rotor assembly of an integrated electrical machine needs good balance, proper piloting and a relatively high stiffness to maintain proper dynamic characteristics.

SUMMARY OF THE INVENTION

The invention can be regarded as a rotor assembly comprising a stack of laminations; a hollow pilot shaft for radially piloting the laminations; and a clamping means for applying an axially compressive force to the stack of laminations. The clamping means includes a second shaft extending through the hollow of the pilot shaft.

The invention can also be regarded as a method of assembling a rotor assembly including a stack of laminations. The method comprises the step of using an external fixture to apply a first axially compressive force to the stack of laminations; inserting a hollow pilot shaft into the stack; inserting a tieshaft into the hollow of the pilot shaft; using the tieshaft to apply a second axially compressive force to the stack; and removing the first axially compressive force.

DETAILED DESCRIPTION OF THE INVENTION

Figure 1:
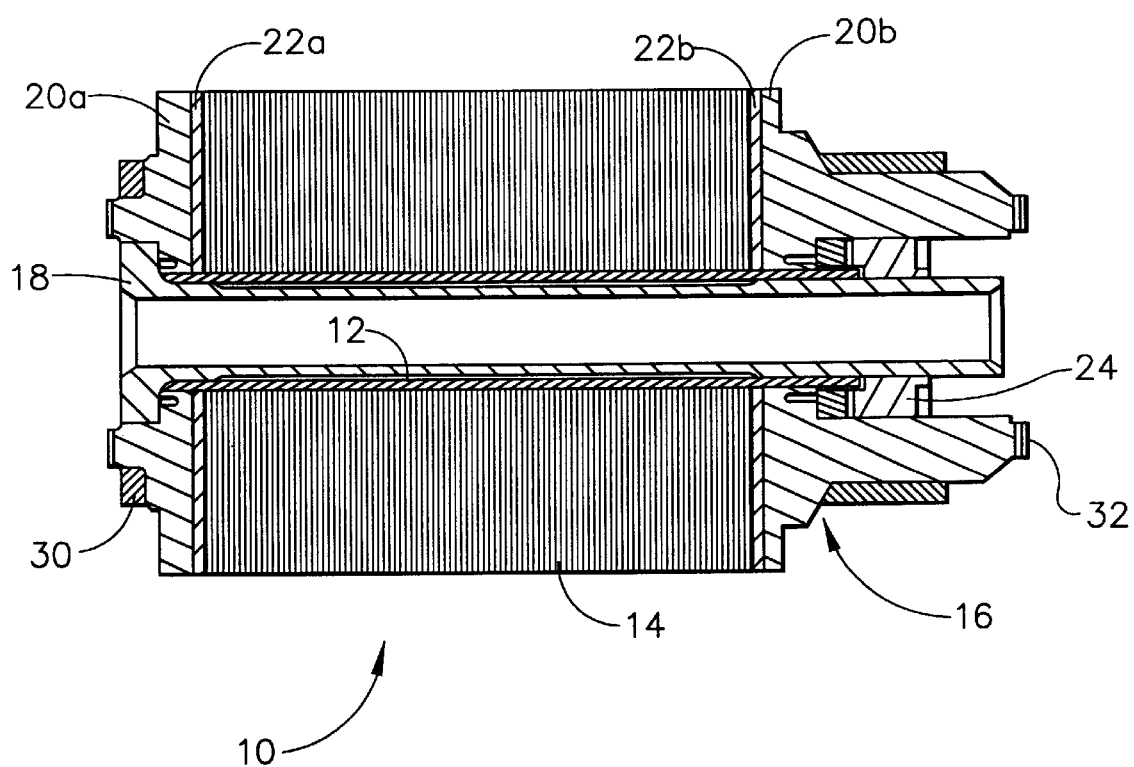
FIG. 1 is an illustration of a rotor assembly according to the invention.

FIG. 1 shows a rotor assembly 10 including a hollow pilot shaft 12 and a stack 14 of magnetic material laminations that are radially piloted by the pilot shaft 12. The laminations can be configured for an electrical machine such as a switched reluctance machine, an inductance machine, or a wound rotor machine. The pilot shaft 12 is inserted into a central bore in the lamination stack 14 and secured to the lamination stack 14 by an interference fit. The wall of the pilot shaft 12 is made as thin as possible. A thinner wall makes the pilot shaft 12 easier to insert into the bore in the lamination stack 14. Additionally, the thinner wall of the pilot shaft 12 causes lower radial stresses in the laminations, which could break if overstressed.

Size of the interference fit between the pilot shaft 12 and the laminations is dependent upon the diameter of the rotor assembly 10. Larger diameters require greater interference fits due to higher tip speeds of the rotor assembly 10. The interference fit is sized such that the interference fit is maintained under all operating conditions. Line-to-line contact is the minimum acceptable interference fit. If the interference fit is not maintained, the laminations will shift relative to one another, causing large amounts of unbalance and vibrations that could cause damage. Shifted laminations will also cause electrical misalignment, which could affect the performance of the electrical machine. The interference fit is easier to maintain at full operating speed and/or full operating temperature if the pilot shaft 12 and the laminations are made of materials having matching coefficients of thermal expansion.

The rotor assembly 10 further includes a clamping assembly 16 for applying a compressive axial force to the lamination stack 14. The compressive axial force increases the stiffness of the rotor assembly 10, thereby minimizing rotor deflection during high-speed operation and improving the rotor dynamics. The clamping assembly 16 includes a tieshaft 18 extending through the hollow of the pilot shaft 12, and first and second end caps 20a and 20b that are relatively movable along the tieshaft 18 to apply an axial compressive force to the lamination stack 14. The end caps 20a and 20b are made of a non-magnetic material. If the end caps 20a and 20b are made of a material having a different coefficient of expansion than that of the laminations, first and second spacers 22a and 22b are assembled between the end caps 20a and 20b and the lamination stack 14. The spacers 22a and 22b are made of a material having a coefficient of thermal expansion that matches the coefficient of thermal expansion of the laminations.

The first end cap 20a is formed integrally with the tieshaft 18, and the second end cap 20b slides along the tieshaft 18. A tieshaft nut 24 engages a threaded end of the tieshaft 18. Tightening the tieshaft nut 24 increases the compressive axial force on the lamination stack 14. In the alternative, both end caps 20a and 20b can be threaded onto the tieshaft 18, and either end cap 20a or 20b can be adjusted to clamp the lamination stack 14.

The tieshaft 18 fits loosely within the hollow of the pilot shaft 12. Axial motion of the tieshaft 18 is constrained. The tieshaft 18 and pilot shaft 12 can be made of different materials, with the tieshaft 18 being made of a higher strength material and having a stiffer construction. For high temperature applications, the tieshaft 18 can be made of Inco718 or another material having durability and high-temperature, high-strength capabilities. The pilot shaft 12 can be made of Ti 64, Ti6242 or another suitable material having a coefficient of thermal expansion that matches the coefficient of thermal expansion of the laminations.

Figure 2:
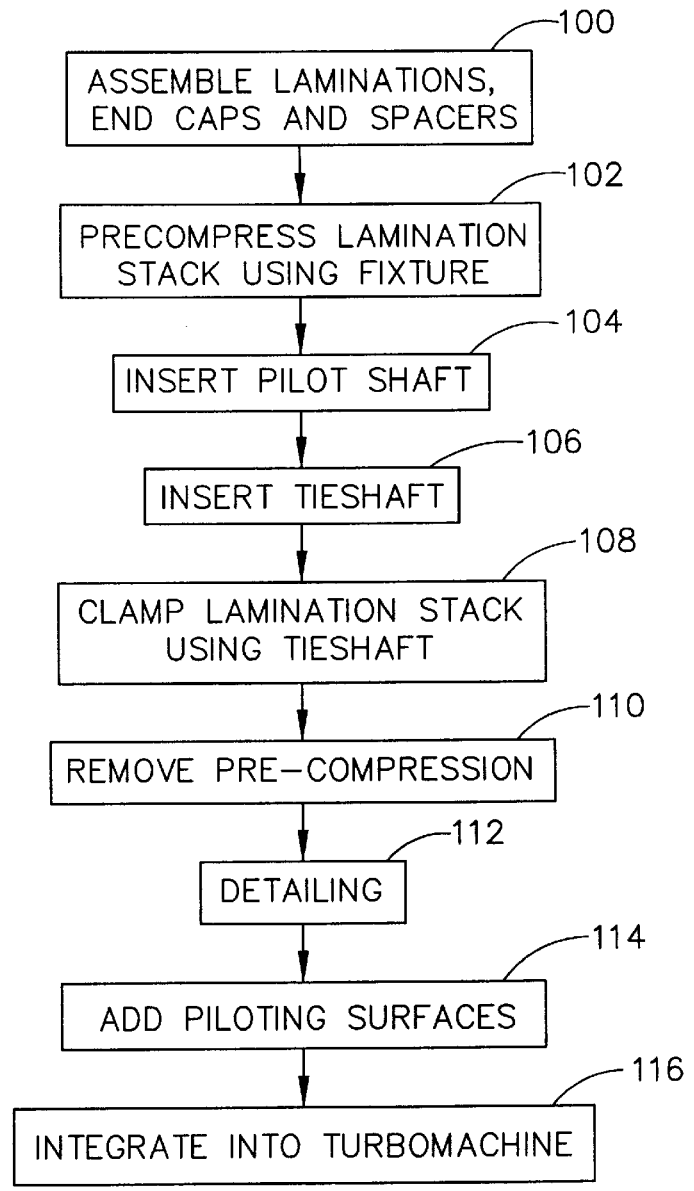
FIG. 2 is a flowchart of a method of assembling the rotor assembly.
Figure 3:
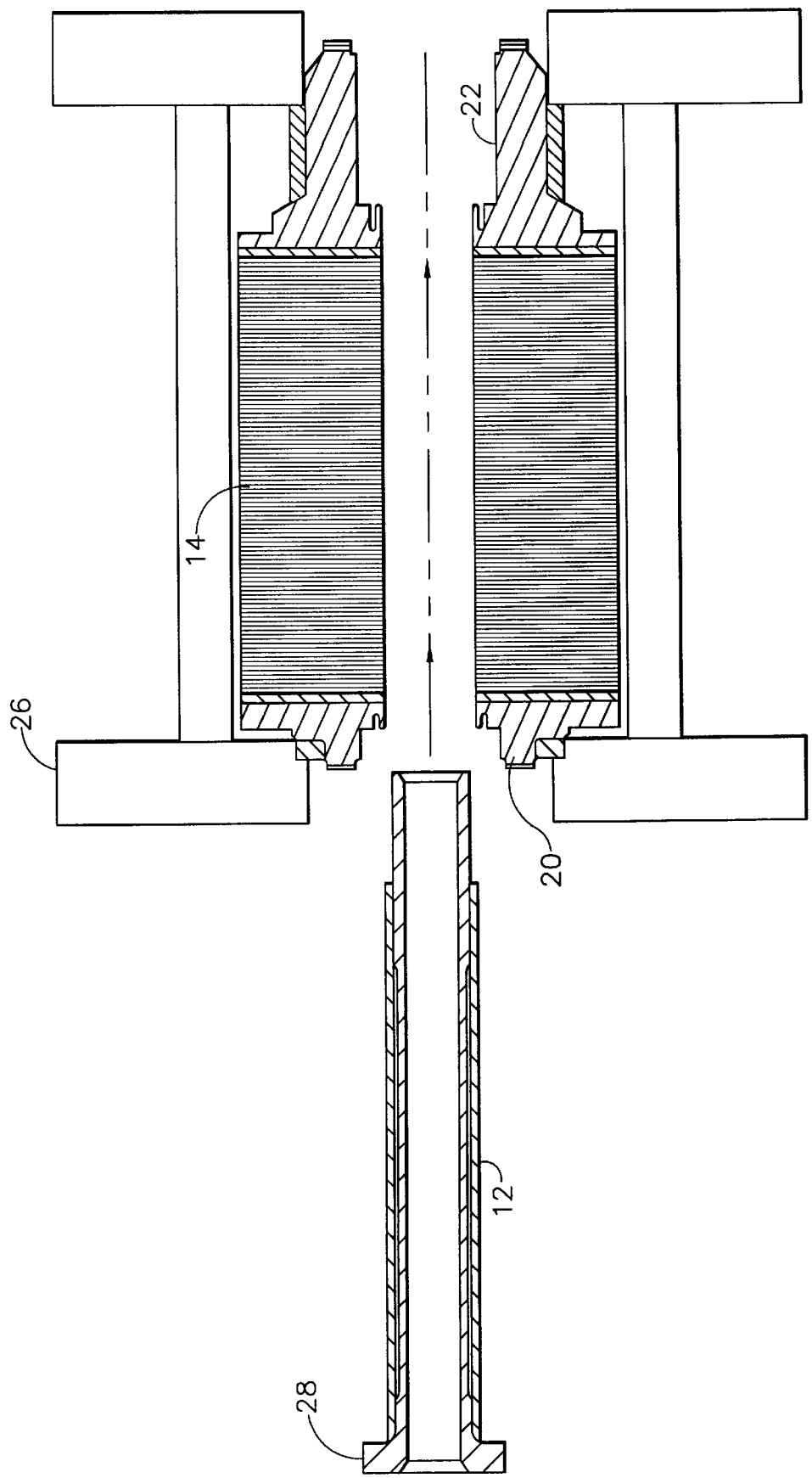
FIG. 3 is an illustration of a partially assembled rotor assembly in a fixture.

FIG. 2 shows the steps for assembling the rotor assembly 10. The end caps 20a and 20b, and spacers 22a and 22b are assembled at opposite ends of the lamination stack 14, and the lamination stack 14 is placed in an external fixture 26, which is shown in FIG. 3 (step 100). The external fixture 26 applies a first axially compressive force to the assembly of the lamination stack 14, the end caps 20a and 20b, and the spacers 22a and 22b (step 102).

While the lamination stack 14 is being pre-compressed, the pilot shaft 12 is inserted into the bore of the lamination stack 14, thus creating the interference fit (step 104). A tool 28, also shown in FIG. 3, can be used to insert the pilot shaft 12. Larger diameter rotor assemblies needing larger interference fits would normally need a greater axial compressive force to forcibly slide the laminations onto the pilot shaft 12. However, pre-compression of the lamination stack 14 eliminates the need for the greater force. The lamination stack 14, the end caps 20a and 20b, and the spacers 22a and 22b are thermally set to a different temperature than the pilot shaft 12, such that the pilot shaft 12 can be inserted into the bore with minimal friction.

After the pilot shaft 12 has been inserted into the lamination stack 14, the tieshaft 18 is inserted into the hollow of the pilot shaft 12 (step 106). The tieshaft nut 24 is tightened to apply a second axially compressive force to the lamination stack 14 (step 108). The second axially compressive force increases the stiffness of the rotor assembly 10. After the second axially compressive force has been applied, the first axially compressive force and the external fixture 26 are removed (step 110).

After the rotor assembly 10 has been assembled, it can be detailed (step 112). The rotor assembly 10 can be balanced by adding or removing balance material 30 (see FIG. 1), and the rotor assembly 10 can be checked and corrected for runout. Detailing the rotor assembly 10 after assembly can be done more easily and less expensively than detailing a conventional rotor during various phases of assembly. Detailing after assembly allows for better quality control of the rotor assembly 10.

Piloting features can be added to the rotor assembly 10 (step 114). The end caps 20a and 20b can be provided with piloting features 32 that engage piloting features of other components of a turbomachine. The piloting features can include curvex, axial face and radial diameter, or other such features. If the rotor assembly 10 is provided with its own bearings, it can function as a self-contained unit. However, the rotor assembly 10 could instead be journalled by bearings from other components of the turbomachine.

Resulting is a component that can be assembled into the rotating group of a turbomachine (step 116). The rotor assembly 10 meets the needs for rotor stiffness, high precision balance and power transfer which are critical design requirements for integration into a turbomachine.

Figure 4:
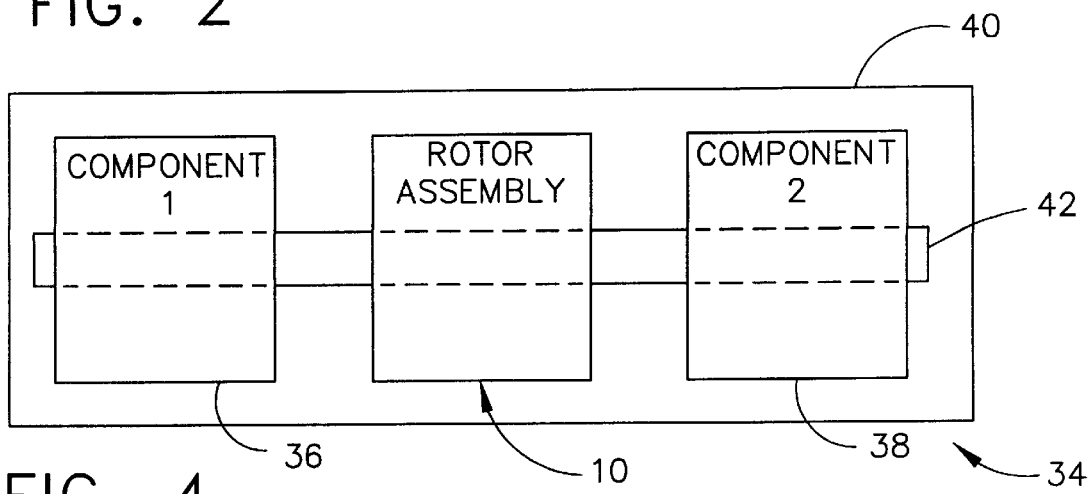
FIG. 4 is a block diagram of a turbomachine including the rotor assembly.

FIG. 4 shows a rotor assembly 10 that is integrated into the rotating group of a turbomachine 34. The rotating group also includes a first component 36 such as a turbine wheel assembly, a second component 38 such as a compressor wheel assembly, and a housing 40. The rotor assembly 10 and the first and second components 36 and 38 are stacked together, with the piloting features 32 on the end caps 20a and 20b of the rotor assembly 10 mating with piloting features on the first and second components 36 and 38. The rotor assembly 10 and the first and second components 36 and 38 are secured together by a group tieshaft 42. The group tieshaft 42 extends through a hollow in the rotor assembly tieshaft 18.

Thus disclosed is a rotor assembly 10 in which radial piloting of the lamination stack 14 is decoupled from axial clamping of the lamination stack 14. Resulting is a rotor assembly having a high tip speed, a short axial length and a relatively high stiffness. The lamination stack 14 can have a length to diameter (L/D) ratio between 1:1 and 2:1. L/D ratios of 3:1 and 4:1 have been reduced to 1:1, yet power output of the electrical machine has not been reduced. Reducing the axial length of the rotor assembly 10 also reduces the length of the turbomachine and improves rotor dynamic performance.

The rotor assembly 10 offers far greater flexibility in turbomachine design than does a conventional rotor assembly utilizing integral bearings. Unlike conventional rotor assemblies, the rotor assembly 10 can be integrated directly with the gas-turbine engine-rotating group. Thus, the rotor assembly 10 can be installed in a turbomachine as a self-contained component, and it can be removed from the turbomachine as a self-contained component. If a unit goes bad, the component can be replaced without having to rework the rest of the turbomachine.

We claim:

1. A method of assembling a rotor assembly including a stack of laminations, the method comprising the steps of;
    using an external fixture to apply a first axially compressive force to the stack of the laminations;
    after said first axially compressive force has been applied inserting a rotatable hollow pilot shaft into the stack of laminations while maintaining said first axially compressive force and creating thereby an interference fit between the pilot shaft and the laminations, said pilot shaft radially piloting said laminations;
    inserting a tieshaft into the hollow of the pilot shaft;
    while maintaining said first axially compressive force using the tie shaft to apply a second axially compressive force to the stack of laminations, whereby the presence of said first axially compressive force results in the magnitude of said second axially compressive force being less than would be required if said first axially compressive force was not present; and
    completing the assembly by removing the first axially compressive force from the stack of laminations, while maintaining said second axially compressive force.

2. The method of claim 1, further comprising the step of detailing the rotor assembly after the first axially compressive force has been removed.

3. The method of claim 1, further comprising the step of adding external piloting features to the rotor assembly after the first axially compressive force has been removed.

4. The method of claim 1, further comprising the step of integrating the rotor assembly with at least one other component of the turbine engine.

5. The method of claim 1, further comprising before the step of inserting the pilot shaft, the step of thermally setting the temperature of the lamination stack to be different from the temperature of the pilot shaft.

* * * * *